March 4, 1969        J. GROSS        3,430,846
BLOWER WITH ELECTRIC DRIVE
Filed March 20, 1967        Sheet _1_ of 2
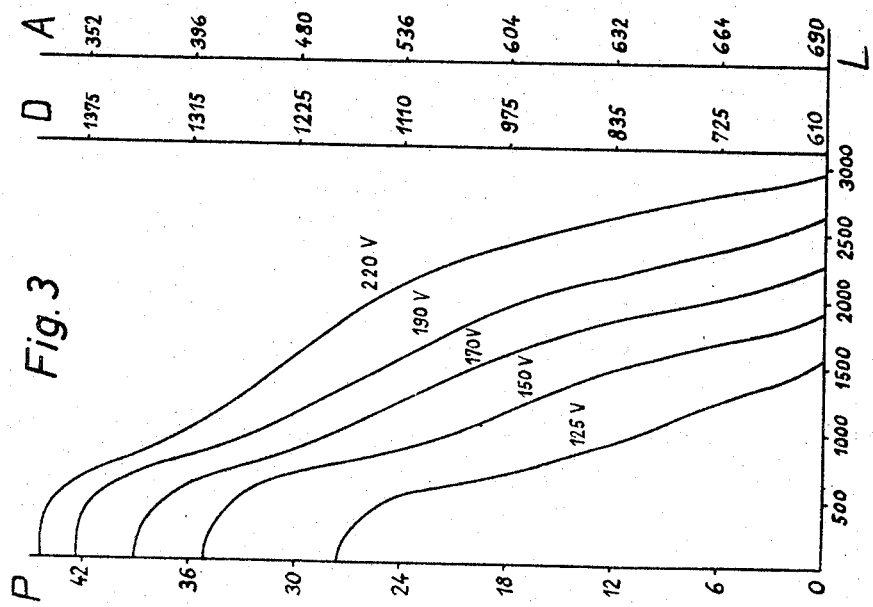
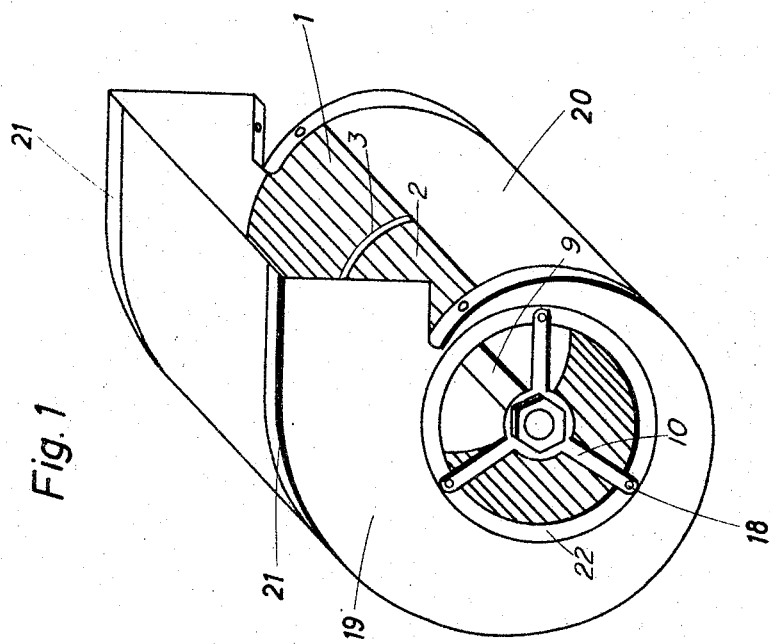
INVENTOR
JOHANN GROSS
BY
Woodhams, Blanchard & Flynn
ATTORNEYS

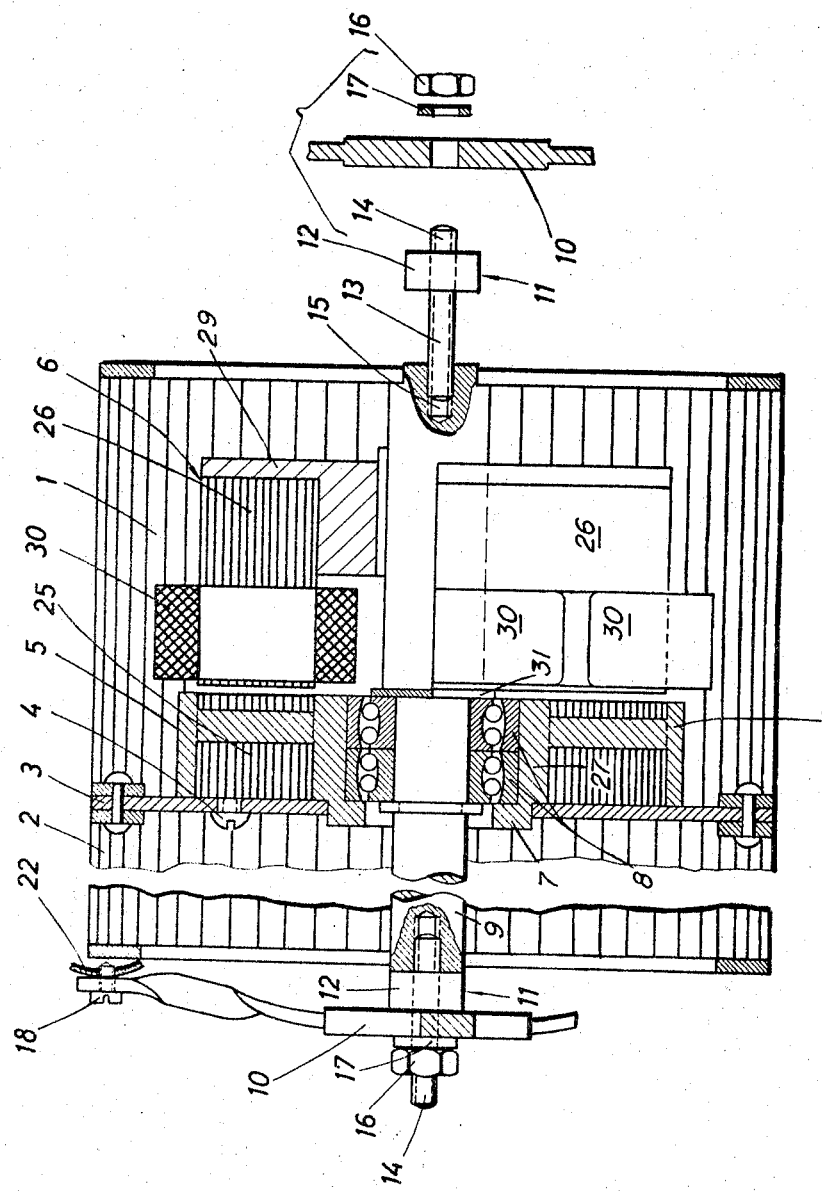

United States Patent Office 3,430,846
Patented Mar. 4, 1969

3,430,846
BLOWER WITH ELECTRIC DRIVE
Johann Gross, Andernach (Rhine), Germany, assignor to Blech- und Metallwarenfabrik, Robert Fischbach Kommanditgesellschaft, Neunkirchen, Kreis Siegen, Germany, a corporation of Germany
Filed Mar. 20, 1967, Ser. No. 624,437
Claims priority, application Germany, Mar. 19, 1966, B 86,275
U.S. Cl. 230—117     2 Claims
Int. Cl. F04d 25/06, 25/08, 17/08

ABSTRACT OF THE DISCLOSURE

A radial flow blower having a casing and a shaft supported in the casing and a drum-type impeller rotatably supported in the casing on the shaft. An electrical induction motor is supported internally of the impeller in the air stream of the blower. The rotor winding means of the electrical induction motor has an electrical resistance of a magnitude sufficient to cause the rotor to slip at at least 25 percent when the blower is operating under free delivery conditions so that the resistance to the flow of air out of the radial flow blower can vary substantially without appreciably affecting the delivery efficiency of said blower.

---

The present invention relates to blowers such as are used in the first line for air heating devices and air-conditioning apparatuses, but also for ventilating and deaerating purposes, i.e. to blowers for a total pressure (static and dynamic) of at least 5 k.p./m.$^2$ and a delivery efficiency of at least 500 m.$^3$/h.

A shortcoming of the known blowers is that their delivery efficiency varies considerably with the resistance of the apparatuses or conduits coupled to them. The hourly air quantity is greatest if the blowers blow out freely in the open air, and it decreases very quickly to "0" with increasing air resistance, i.e. the characteristic curve of such blowers is very flat. This behaviour causes great difficulties in practical operation as when ordering the blowers the air resistance is generally not exactly known. If this resistance deviates from the resistance assumed the air quantity is considerably exceeded or falls short of the desired quantity, both of the two facts being undesirable.

It is the general purpose of the invention to provide a blower with electric drive in which the delivery efficiency varies only little with the resistance of the air conduits connected to it without any modification to the blower or its drive being necessary. The desired behaviour of the blower is obtained, according to the invention, by using on the one hand a known centrifugal blower with vanes bent forward and on the other hand a monophase or polyphase induction motor is used for the drive of the blower, the rotor of which is arranged with such a high resistance that the motor runs with a slip of at least 25% and preferably 50% when it drives the blower blowing out freely into the open air.

A blower with vanes bent forward has, as is generally known, the characteristic feature that the pressure head generated in the blower decreases with decreasing delivery efficiency. If for driving such a blower an induction motor with high slip is used, the characteristics of the blower and the motor supplement each other in such a way that starting from the maximum delivery efficiency, i.e. from the freely blowing blower and the lowest static and dynamic pressure generated by the blower, the sum of both pressures, i.e. the total pressure, increases steeply with decreasing delivery efficiency. This means that within a predetermined pressure-range, e.g. between 6 and 15 mm. water column corresponding to a pressure of 6 to 15 k.p./m.$^2$ the delivery efficiency changes only so little that the variation remains within the admissible tolerances of the blower.

As induction motors three-phase motors as well as mono-phase motors may be used. Disk armature motors are particularly favorable because in this case the cooling of the rotor does not cause any difficulties. The rotor and the stator are equivalent with respect to cooling and, in addition, lie in the air stream of the blower, if the blower fan or wheel is fastened directly on the rotor. It is advantageous to use such motors in the form of monophase condensor motors. These motors can easily be given such a characteristic that the delivery efficiency in the considered work range of the blower varies relatively little, the pressure, however, relatively strongly.

As is shown in practical operation, disk-armature motors may run at the full moment of rotation at 50 to 60 percent of the nominal number of revolutions, i.e., with a slip of 40 to 50 percent without any danger of an excessive heating of the motor. There is thus the possibility to drive the freely blowing when it is driven by a four-pole motor, at a number of revolutions of 750–950 r.p.m. so that the number of revolutions may increase considerably with increasing value of the air resistance and decreasing moment of rotation. The blower is thus able to work, e.g., with air resistances between 0 and 20 mm. water column without its delivery efficiently decreasing to an inadmissible extent. It amounts e.g. also to nearly 90 percent of the delivery efficiency even if in the known blowers working with common induction motors, the delivery efficiency has already dropped to "0."

One embodiment of the invention is described hereinafter on the basis of the drawings.

FIG. 1 is a perspective representation of a blower with vanes bent forward and with a disk armature motor as drive, FIG. 2 is a section through the same blower without its casing, and FIG. 3 is a diagrammatic representation of the behaviour of the blower with different total pressures.

FIG. 1 shows a blower of known type composed of two similar fans 1 and 2. Both fans have vanes bent forward and are fastened in their center on a carrier disk 3 having the form of an annular sheet metal disk. As is shown in FIGURE 2, the carrier disk 3 is fastened with three screws 4 on the rotor 5 of a disk armature motor, the stator of which is labelled 6. For facilitating the centering of the fan 1, a centering rim 7 is arranged on the rotor 5 which allows an additional centering of the said fan. The rotor 5 is rotatably carried within its axial width by means of two ball-bearings 8 on a stationary shaft 9 passing through the fans 1 and 2 and also through the stator 6 and fastened on both ends of the blowers, on arm crosses or spiders 10. Rubber metal bodies 11 consisting of two threaded bolts 13 and 14 embedded in a rubber body 12 serve to fasten the rubber metal body 11. The bolt 13 is screwed into a threaded bore 15 of the axle 9. An arm cross 10 is fastened on the threaded bolt 14, a nut 16 with a washer 17 serving as a fastening.

The arm crosses 10 themselves are fastened on the side walls 19 of the blower casing by means of screws 18. This casing consists of a spirally bent metal sheet 20 and two likewise spiral, metal side sheets 19, the bent-off rims 21 of which are fastened on the sheet or scroll 20 by spot-welding. From each side wall 19 an annular bead 22 is formed toward the exterior (FIG. 1) which bead serves as an inlet ring for the aspirated air. Its inner diameter is smaller than the outer diameter of the fans. In order to make it possible to introduce the blower into the casing, the spiral-shaped scroll 20 ends short of the outlet opening of the blower casing 5.

As already indicated, the disk armature motor consists of the rotatably carried rotor 5 and the stationary stator 6. Both have annular wound armature core plates 25, 26 made of sheet iron. The rotor has closed grooves and a short-circuit winding cast into it with an inner and outer short-circuit ring 27 or 28, respectively. The armature core plates 26 of the stator are fastened on the shaft 9 by means of a hub 29 in such a manner that they cannot rotate. The armature core plates have open grooves into which the winding 30 is incorporated. A spacer disk 31 determines the air gap between the rotor and the stator.

The resistance of the cited short-circuit winding including its short-circuit rings 27/28 is provided so high that the motor will run as a freely blowing blower at a slip of at least 25%, preferably 50%. If with this configuration of the motor a piping is coupled to the blower, the number of revolutions of the motor increases with increasing air resistance of the cited conduit. This increase of the number of revolutions goes along with a rapid increase of the total pressure of the blower, the delivery efficiency of the motor decreasing only little.

The behaviour of the blower and the motor respectively is shown in the diagram of FIG. 3 in which the air delivery efficiency L is shown in m³./h. and on the ordinate P the static pressure of the blower in mm. water column is shown. On the right-hand side of the diagram two further ordinates are shown. One indicates the number of revolutions D per unit of time and the other the power A absorbed by the motor. This diagram shows a monophase induction motor with the auxiliary winding connected across a condenser which does not only serve the starting, but remains connected during normal operation. The size of the condenser amounts in the motor used to 12μ F. FIGURE 3 illustrates a family of curves drawn to represent the blow performance in correspondence to the application of different voltages to the induction motor.

The diagram shows that a blower designed for e.g. a statical pressure of 6 mm. has a delivery efficiency of 2,800 m.³/h when a voltage of 220 volts is applied to the motor. If the connected air conduit requires instead of a provided pressure of 6 mm. water column a pressure of 12 mm., the diagram shows that this static pressure is reached with an air delivery efficiency of 2,600 m.³/h. This decrease of the air delivery efficiency is within the admissible limits.

It is also possible to reach smaller decreases of the air delivery efficiency if the motor is correspondingly dimensioned, if e.g. with a condenser motor the size of the condensor and the dimensions of the auxiliary windings are chosen correspondingly.

In the diagram in FIG. 3 the behaviour of the blower is shown as stated above for different operational voltages of the motor. The diagram shows that by modifications of the operational voltage the air delivery efficiency with freely blowing blower can be varied and that also under thus modified conditions the desired behaviour of the blower is maintained.

The embodiments of the invention in which an exclusive property or privilege is claimed are defined as follows:

1. A radial flow blower comprising:
    a casing having an air intake port means and air outlet port means;
    a shaft fixedly supported in said casing;
    a drum-type impeller rotatably supported in said casing on said shaft, said impeller having a plurality of axially extending vanes circumferentially spaced around the periphery thereof defining air moving surfaces directing the air radially;
    an electrical induction motor having stator winding means and rotor winding means mounted internally of said casing in the air stream between said inlet port means and said outlet port means, said stator winding means fixed to said shaft, said rotor winding means fixed to said impeller and rotatable therewith and with respect to said shaft whereby said induction motor will drive said impeller to cause the air to move radially of said vanes, said rotor winding means having an electrical resistance of a magnitude sufficient to cause the rotor to slip at at least 25 percent when said blower is operating under free delivery conditions, whereby the resistance to the flow of air at said outlet port can vary substantially without appreciably affecting the delivery efficiency of said blower.

2. A radial flow blower comprising:
    a casing having a pair of end walls, at least one of said end walls having an opening therein defining an air intake port;
    a shaft fixedly secured to and extending between said end walls of said casing;
    a drum-type impeller rotatably supported in said casing on said shaft concentrically of said air intake port, said impeller having axially extending vanes circumferentially spaced around the periphery of said impeller to define air moving surfaces directing the air radially;
    an air outlet port in said casing external to said impeller and extending substantially the length of said blower whereby said vanes will direct the air radially toward said outlet port;
    an electrical induction motor having stator means and rotor means mounted internally of said impeller in the air stream between said air intake port and said air outlet port, said stator means fixed to said shaft, said rotor means comprising an annular disk supported for rotation relative to said shaft and including means securing said rotor to said impeller, said rotor means having an electrical resistance of a magnitude sufficient to cause the rotor to slip at at least 25 percent when said blower is operating under free delivery conditions whereby the resistance to the flow of air at said outlet port can vary substantially without appreciably affecting the delivery efficiency of said blower and the air entering said air intake port will circulate around said stator and said rotor thereby cooling same.

References Cited

UNITED STATES PATENTS

| | | | |
|---|---|---|---|
| 2,495,189 | 1/1950 | Stein et al. | 310—166 |
| 2,895,666 | 7/1959 | Girdwood et al. | 230—117 |
| 3,194,165 | 7/1965 | Sorlin. | |
| 3,332,612 | 7/1967 | Gross | 230—117 |

FOREIGN PATENTS 626,080  5/1959  Italy.

ROBERT M. WALKER, *Primary Examiner.*

U.S. Cl. X.R.

230—128; 310—166